United States Patent [19]

Chubachi et al.

[11] Patent Number: 5,349,862
[45] Date of Patent: Sep. 27, 1994

[54] APPARATUS FOR MEASURING THE VELOCITY OF ULTRASONIC SOUND IN TERMS OF V(Z) CHARACTERISTICS AND ULTRASONIC MICROSCOPE USING THAT APPARATUS

[76] Inventors: Noriyoshi Chubachi, 4-3-18 Kaigamori; Hiroshi Kanai, 4-18-1-301 Nakayama, both of Aobu-Ku, Sendai-shi, Miyagi-ken, Japan

[21] Appl. No.: 795,041

[22] Filed: Nov. 20, 1991

[30] Foreign Application Priority Data

Nov. 25, 1990 [JP] Japan ................................. 2-321737

[51] Int. Cl.⁵ ...................... G01N 29/18; G01N 29/24
[52] U.S. Cl. ........................................ 73/602; 73/606
[58] Field of Search ................. 73/606, 624, 628, 602, 73/627, 626

[56] References Cited

U.S. PATENT DOCUMENTS

| | | | |
|---|---|---|---|
| 4,503,708 | 3/1985 | Kino et al. | 73/628 |
| 4,510,810 | 4/1985 | Kanda et al. | 73/606 |
| 4,524,621 | 6/1985 | Yamanaka | 73/606 |
| 4,730,494 | 3/1988 | Ishikawa et al. | 73/606 |
| 5,211,059 | 5/1993 | Hayakawa et al. | 73/606 |

FOREIGN PATENT DOCUMENTS

0121890 10/1984 European Pat. Off. .

OTHER PUBLICATIONS

Japanese Journal of Applied Physics, vol. 22, 1983, supplement 22-3, pp. 60–62, Tokyo, JP; K. Yamanaka, "Velocity measurement of surface acoustic wave by means of impulsive converging beam".

Review of Scientific Instruments, vol. 57, No. 3, Mar. 1986, pp. 446–452, New York, US; K. K. Liang et al, "Precision phase measurement with short tone burst signals in acoustic microscopy".

*Primary Examiner*—Hezron E. Williams
*Assistant Examiner*—Rose M. Finley
*Attorney, Agent, or Firm*—Fay, Sharpe, Beall, Fagan, Minnich & McKee

[57] ABSTRACT

The ultrasonic sound velocity measuring apparatus or ultrasonic microscope moves the sample to be measured or examined relative to a focusing acoustic probe from its focal point to a defocus point closer to the probe; subjects the intensity of a first reception signal in the peripheral portion of the transducer of the acoustic probe as obtained therefrom in response to said relative movement of the sample, the phase difference between the first reception signal and either the signal for driving the acoustic probe or the corresponding reference signal, the intensity of a second reception signal in the central portion of the transducer of the acoustic probe as obtained therefrom in response to said relative movement of the sample, and the phase difference between the second reception signal, and either the signal for driving the acoustic probe or the corresponding reference signal to more than one sampling at time intervals corresponding to positions in the defocus direction; and obtains data on the intensity and phase difference of the plurality of the first reception signals as obtained by the sampling step as well as data on the intensity and phase difference of the plurality of the second reception signals as obtained by the sampling step as data for vector functions, with respect to the position in the defocus direction, of the wave of interference between the leaky elastic surface wave component and the reflected wave component near the central axis of the acoustic probe so as to calculate the velocity of the leaky elastic surface wave component.

9 Claims, 7 Drawing Sheets

APPARATUS FOR MEASURING THE VELOCITY OF ULTRASONIC SOUND IN TERMS OF V(Z) CHARACTERISTICS AND ULTRASONIC MICROSCOPE USING THAT APPARATUS

BACKGROUND OF THE INVENTION

This invention relates to an apparatus for measuring the velocity of ultrasonic sound in terms of V(z) characteristics, as well as an ultrasonic microscope using that apparatus. More particularly, this invention relates to an Ultrasonic microscope of a type the uses so-called "V(z) characteristics" to determine the velocity of a leaky elastic surface wave from a sample to be examined and which is adapted to achieve a higher resolution by reducing the amount of relative movement of the sample in the Z-direction (the axis parallel to the direction of the height of the microscope) to less than one period of the V(z) characteristic curve. The term "V(z) characteristics" as used herein means the periodic characteristics of the intensity of signal reception of a wave generated by the interference between two components of an ultrasonic beam that has been focused by an acoustic probe and that has been applied to the sample, i.e., the reflected wave from an area near the Z-axis and the reradiated leaky elastic surface wave from the sample. The reradiated leaky elastic surface wave is obtained by excitation with that component of the convergent ultrasonic beam which has been applied to the sample at an angle near the critical Rayleigh angle, and the V(z) characteristics are obtained by making a relative movement of the sample in a direction ($-Z$ direction) in which the sample approaches the acoustic probe, with the origin being the focal point of the incident ultrasonic beam.

Figure 7:
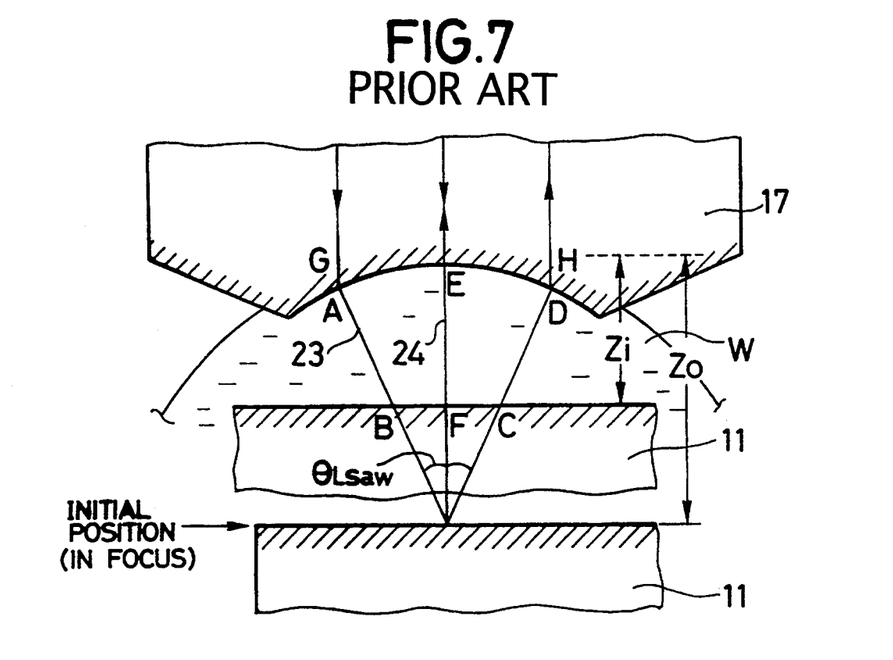
FIG. 7 is an enlarged cross section of the acoustic probe portion of a conventional ultrasonic microscope.

FIG. 7 is a partial enlarged cross section of the acoustic probe of an ultrasonic microscope. The acoustic probe indicated by 17 is fixed to the Z-scanning axis (height axis) of the measuring mechanism of the microscope, and usually consists of a transducer (thin piezoelectric film) and a lens. The transducer is driven intermittently at constant time intervals in response to burst signals from the measuring part, whereupon burst (ultrasonic) waves are emitted towards the surface of a sample 11 to be examined.

Among the emitted burst waves, the one that has travelled in the path G - A - B to fall on the surface of the sample 11 at the critical angle ($\theta$Lsaw) is converted to a leaky elastic surface wave which, as it propagates from the incident point B through the surface of the sample 11, reradiates a wave at the critical Rayleigh angle, and the one that is reradiated at point C on the surface of the sample is emitted towards point D of the acoustic probe 17. The emitted wave follows the return path that is parallel to the path G in the probe in which the incident burst wave travelled, whereupon it returns to the other end of the piezoelectric device. Although only one sound wave is shown in FIG. 7 to propagate in the path G - A - B - C - D - H, the above explanation shall apply to all sound waves that propagate in the paths at the positions obtained by rotating the path G - A - B - C - D - H about the axis of the probe. The signal obtained by receiving those waves corresponds to the reradiated component of the aforementioned leaky elastic surface wave.

Besides this wave, a burst wave 24 that has been emitted from the probe 17 in a direction normal to the surface of the sample 11 travels in the path E - F - E to return to the piezoelectric device. This is the reflected wave from an area near the Z-axis also mentioned above. These two wave components have a phase difference that is based on the difference between their path lengths. As a result, the two wave components interfere with each other and the interference signal is received by the probe 17. Shown by W in FIG. 7 is a sound field-creating liquid medium.

Figure 8:
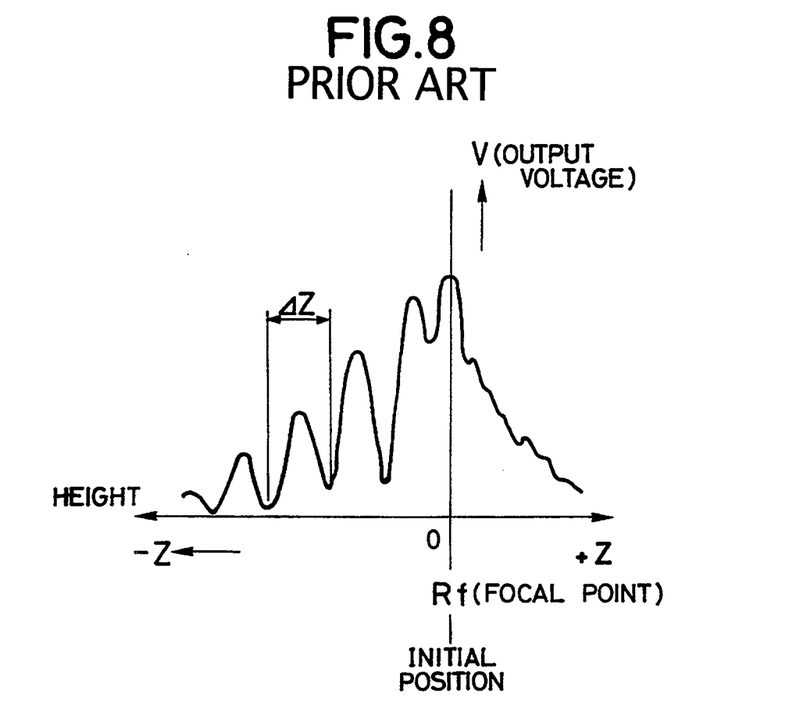
FIG. 8 is a diagram showing a typical V(z) characteristic curve.

If the distance of path E - F is varied, the phase difference between the two burst waves 23 and 24 due to the difference between their path lengths will change accordingly, producing interference variations in the received signal to create the so-called "V(z) characteristics" as shown in FIG. 8. The velocity of the leaky elastic surface wave travelling between points B and C through the surface of the sample can be calculated from the dip period $\Delta z$ of the characteristics curve (the dip period is hereunder referred to simply as the "period"), as a result of which the surface of the sample can be analyzed. Details of this technique are already known by disclosure in many references including Weglein, Applied Physics Letters, 34(3), 179–181, Feb. 1, 1979.

As is clear from the V(z) characteristic curve shown in FIG. 8, in order to determine the period $\Delta z$ in a correct way, it is necessary in practice to measure the intensity of interference wave over several periods in consideration of noise and precision of measurements. Under the circumstances, the sample 11 has to be moved relative to the acoustic probe 17 in the $-Z$ direction by the amount necessary for the measurement. However, this movement has one serious problem: as one can understand from FIG. 7, the greater the amount of movement in the Z direction, the longer the distance of path B - C.

Increasing the distance of path B - C for the purpose of obtaining the correct value of the period $\Delta z$ means taking data for the case where the diameter of the convergent beam increased. The velocity of the leaky elastic surface wave as calculated from the data corresponds to the increased length of path B - C. The resolution of data on such parameters as the nature and crystalline structure of the material of interest as obtained in a manner dependent upon the velocity of the leaky elastic surface wave and the resolution of the image that is depicted in a manner dependent upon the velocity of the same leaky elastic surface wave are limited by the length of path B - C, so the values of those resolutions cannot be made adequately high if the length of path B - C is not reduced.

In order to improve the resolution of the structural analysis of materials or that of ultrasonic images, one may either prevent the distance of path B - C from increasing or limit the distance of movement in the Z direction. However, the first approach is limited in terms of the critical angle and, hence, the scope of materials that can be analyzed is restricted, whereas the second approach which uses the V(z) characteristics to measure the period $\Delta z$ has a theoretical difficulty in that the distance of movement must be slightly greater than the value necessary for determining one period of $\Delta z$, but cannot be made shorter than the corresponding length of path B - C.

SUMMARY OF THE INVENTION

The ultrasonic sound velocity measuring apparatus or ultrasonic microscope of the present invention which relies on the V(z) characteristics is characterized by the following: the sample to be measured or examined is moved relative to a focusing acoustic probe from its focal point to a defocus point closer to the probe; the intensity of a first reception signal in the peripheral portion of the transducer of the acoustic probe as obtained therefrom in response to said relative movement of the sample, the phase difference between the first reception signal and the signal for driving the acoustic probe or the corresponding reference signal, the intensity of a second reception signal in the central portion of the transducer of the acoustic probe as obtained therefrom in response to said relative movement of the sample, and the phase difference between the second reception signal and the signal for driving the acoustic probe or the corresponding reference signal are subjected to more than one sampling at time intervals corresponding to positions in the defocus direction; data on the intensity and phase difference of the plurality of the first reception signals as obtained by the sampling step as well as data on the intensity and phase difference of the plurality of the second reception signals as obtained by the sampling step are obtained as data for vector functions, with respect to the position in the defocus direction, of the wave of interference between the leaky elastic surface wave component and the reflected wave component near the central axis of the acoustic probe so as to calculate the velocity of the leaky elastic surface wave component.

By detecting not only the intensity but also the phase difference of each of the reception signals for the leaky elastic surface wave component and the reflected wave component from the central portion of the acoustic probe as functions of the position in the Z direction, data for vector functions of the leaky elastic surface wave component with respect to the position in the defocus direction can be computed so as to determine the sound velocity of the elastic wave skimming the surface of the sample material of interest.

Hence, in accordance with the present invention, the velocity of the elastic surface wave can be measured by merely sampling intensity and phase difference data at a plurality of positions over the distance of travel in the Z direction, and the necessary amount of movement in that direction may be less than one period of $\Delta z$.

As a result, the path of propagation of the leaky elastic wave skimming the surface of the sample can be sufficiently reduced to improve the resolution of its structural analysis or imaging.

An object, therefore, of the present invention is to provide an ultrasonic sound velocity measuring apparatus or ultrasonic microscope that rely upon the V(z) characteristics and which require the sample to be moved over a shorter distance in the Z direction in measuring the sound velocity of the leaky elastic wave skimming the surface of the sample.

Another object of the present invention is to provide an ultrasonic sound velocity measuring apparatus or ultrasonic microscope that rely upon the V(z) characteristics and which insure a higher resolution in the structural analysis of the sample.

A further object of the present invention is to provide an ultrasonic sound velocity measuring apparatus or ultrasonic microscope that rely upon the V(z) characteristics and with which the attenuation factor of the sample can be measured in a more correct way.

Still another object of the present invention is to provide an ultrasonic microscope that is capable of producing the image of the sample with high resolution.

DESCRIPTION OF THE PREFERRED EMBODIMENTS

Figure 1:
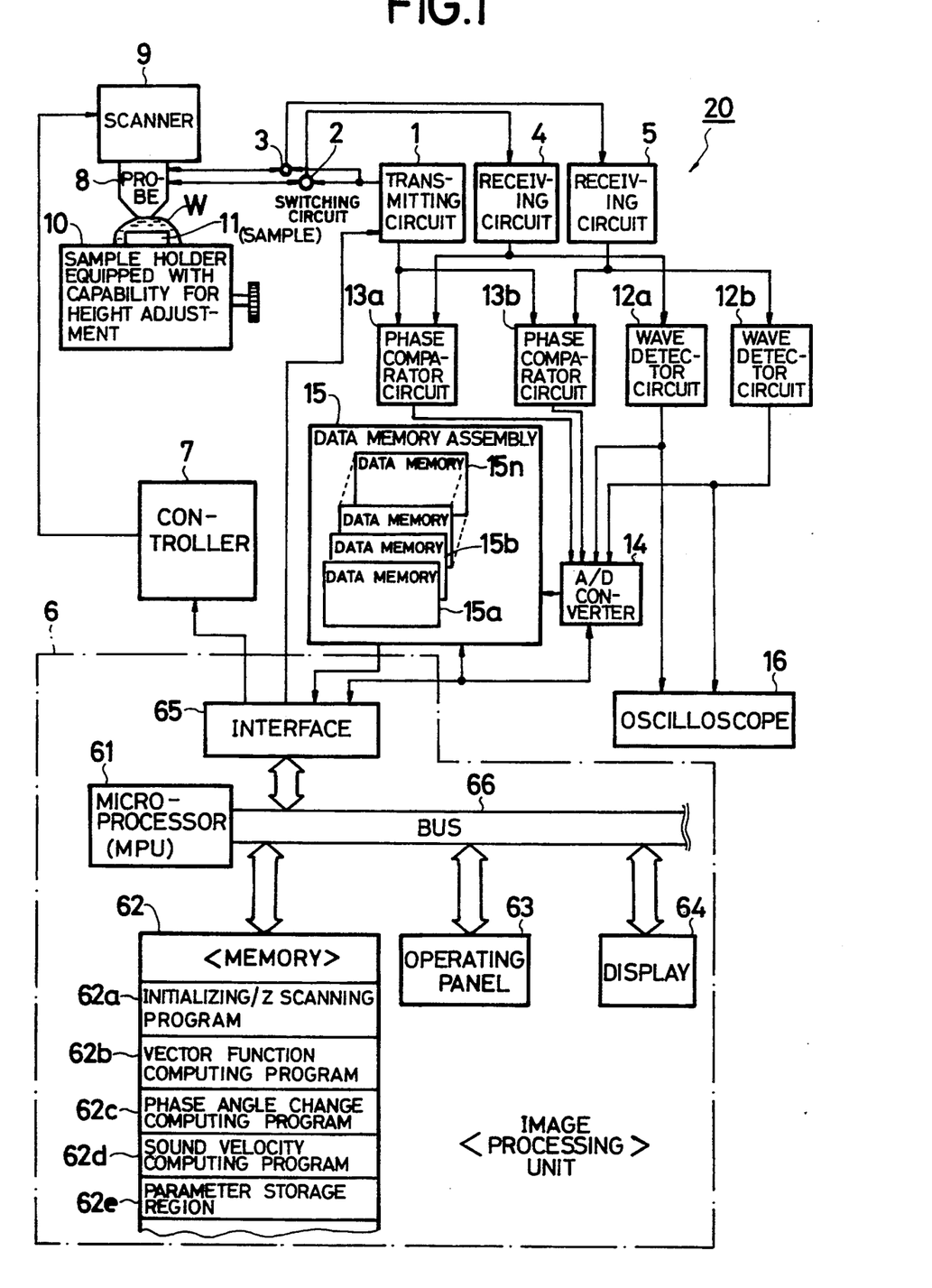
FIG. 1 is a block diagram of an ultrasonic microscope that uses an ultrasonic sound velocity measuring apparatus relying upon the V(z) characteristics in accordance with an embodiment of the present invention.
Figure 2:
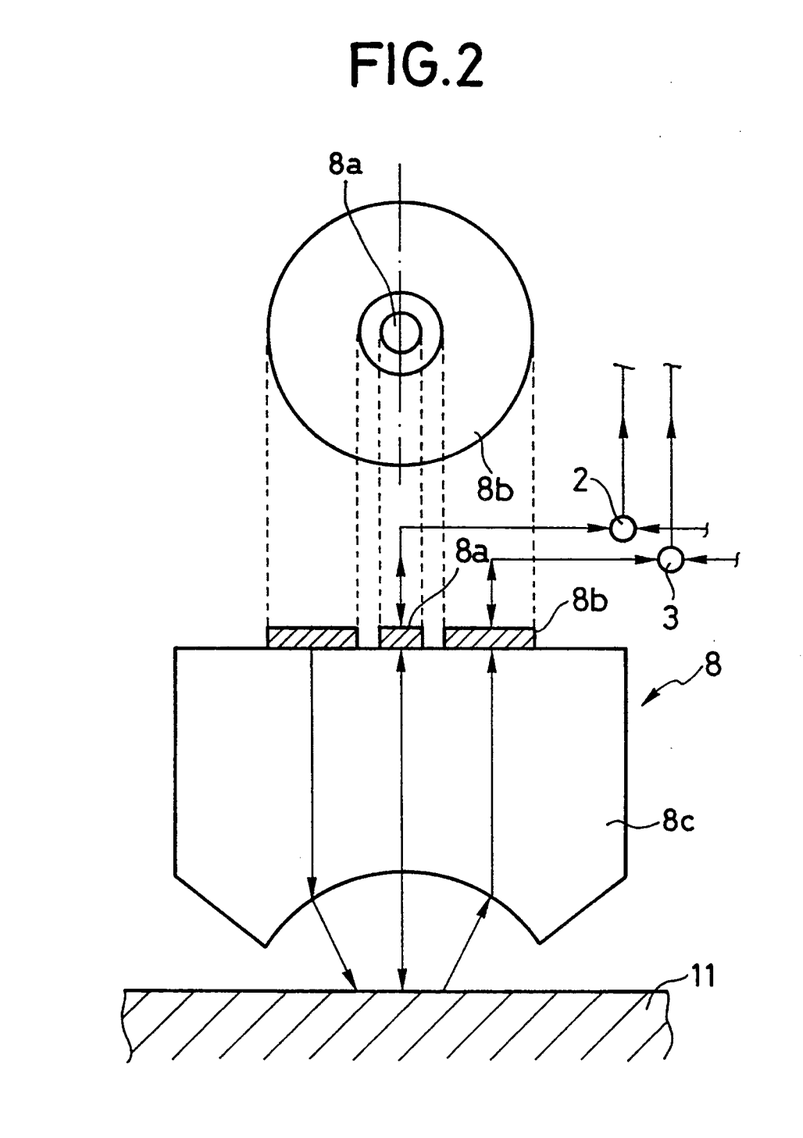
FIG. 2 shows the acoustic probe of the ultrasonic microscope as it is seen both from the top and in transverse section.

FIG. 1 is a block diagram of an ultrasonic microscope that uses an ultrasonic sound velocity measuring apparatus relying upon the V(z) characteristics in accordance with an embodiment of the present invention. The ultrasonic microscope generally indicated by 20 contains a transmitting circuit 1 that generates signals in the form of burst waves (hereunder referred to as "burst signals"). The transmitting circuit 1 sends two burst signals of identical waveform to an acoustic probe 8 via circuits 2 and 3 which perform selective switching between signal transmission and reception modes. As shown in FIG. 2, the acoustic probe 8 held by a scanner 9 has a transducer that is split into two segments, one being positioned along the central axis and the other being positioned outside it as the peripheral. The two transducers, 8a (central piezoelectric film) and 8b (peripheral piezoelectric film) of the probe 8 are simultaneously supplied with burst signals of identical phase and amplitude to be driven simultaneously in response to those signals. The resulting ultrasonic burst wave is applied to the surface of a sample 11 placed on top of a table 10 having a capability for height adjustment. The transducer 8a is positioned in such a way that its center is in substantial alignment with the central axis (z axis) of the acoustic probe 8, whereas the transducer 8b, which is annular in shape, surrounds the transducer 8a with a given spacing allowed. Shown by 8c is an acoustic lens having the transducers 8a and 8b provided on one of its surfaces.

The reception signal converted to an electrical signal by means of the transducer 8a is the wave of interference between the leaky elastic surface wave component and the reflected wave component from an area near the center axis of the acoustic probe 8. This reception signal is chiefly composed of the second component, and is sent to a signal receiving circuit 4 (see FIG. 1) via the switching circuit 2. The reception signal converted to an electric signal by means of the transducer 8b is also the wave of interference between the leaky elastics surface wave component and the reflected wave component from an area near the center axis of the acoustic probe 8, except that it is chiefly composed of the first component. This reception signal is sent to a signal receiving circuit 5 via the switching circuit 3.

The signal receiving circuits 4 and 5 are high-frequency amplifier circuits of the same configuration that amplify an input signal to a predetermined level. The output of the receiving circuit 4 is supplied to both a wave detector circuit 12a and one input of a phase comparator circuit 13a. The output of the receiving circuit 5 is supplied to both a wave detector circuit 12b and one input of a phase comparator circuit 13b. The wave detector circuits 12a and 12b perform envelope detection on the respective input signals and the output of each detector is delivered to an A/D converter circuit (A/D) 14. As a result, the absolute value of the amplitude of each of the received signals is produced as a digital value from the A/D 14 in synchronism with the sampling for A/D conversion. The outputs of detector circuits 12a and 12b are also supplied to an oscilloscope 16 for enabling the waveforms of received signals to be observed.

Each of the phase comparator circuits 13a and 13b is supplied at the other input with a burst signal from the transmitting circuit 1 as a reference signal for comparison. The comparator circuit 13a (or 13b) compares the phase of the output signal from the receiving circuit 4 (or 5) with that of the burst signal as produced during the driving of the acoustic probe 8, and the resulting phase difference signal from each comparator is supplied to the A/D 14.

As a result, the amplitudes of the respective signal waves on interference as received by the transducers 8a and 8b as well as their differences in phase from the burst signal are simultaneously detected as digital values by the A/D 14 in synchronism with the sampling for A/D conversion.

The timing of sampling for A/D conversion is controlled by an image processing unit 6. The data converted by the A/D 14 are successively sent for storage in a measuring data memory assembly 15. The addresses in the data memory assembly 15 are updated for each event of sampling for A/D conversion, so that when the acoustic probe 8 performs X-Y plane scanning on the sample 11, data corresponding to the respective points of measurement are successively stored at the associated addresses as the plane scanning proceeds.

The measuring data memory assembly 15 has n data memories 15a, 15b, ... 15n (n is an integer of 2 or more). Each data memory corresponds to a single X-Y plane scanning and stores the measured data. In response to the updating of the z-coordinate which is a point of measurement in the Z direction, another one of those data memories is selected and accordingly updated. Among the data stored in the measuring data memory assembly 15, those which are necessary for computation are read in as referenced by MPU (microprocessor) 61 in the image processing unit 6 and subsequently stored in predetermined regions of a memory 62.

Suppose here that the probe 8 is brought to a defocused position in the $-Z$ direction. If the outputs from the A/D 14, namely, the absolute value of the amplitude and the phase difference of an electrical signal from the transducer 8a, are sampled at a plurality of points for the Z-coordinate, more than one pair of two parameters, i.e., the absolute value of the amplitude of an electrical signal from the transducer 8a and the phase difference corresponding to that absolute value, are obtained. The values of those pairs are expressed by a certain vector function, which is denoted here by vector Va(z).

Similarly, more than one pair of parameters can be obtained for an electrical signal obtained by conversion in the transducer 8b, namely, the absolute value of the amplitude of that electric signal and the phase difference corresponding to that absolute value, and the values of those pairs are also expressed by a certain vector function, which is denoted here by vector Vb(z). Also suppose that the vector functions of the leaky elastic surface component and the reflected wave component from an area near the center axis of the acoustic probe are denoted by vector VI(z) and vector VL(z), respectively. Since each of vector Va(z) and vector Vb(z) is the wave of interference between the associated vectors VL(z) and VI(z), the following relationships will hold:

$$\text{Vector } Va(z) = CLa \cdot \text{vector } VL(z) + CIa \cdot \text{vector } VI(z)$$

$$\text{Vector } Vb(z) = CLb \cdot \text{vector } VL(z) + CIb \cdot \text{vector } VI(z) \quad (1)$$

where CLa, CLb, CIa and CIb are each a constant as a complex number (i.e., a complex constant) and z is the Z-coordinate (the coordinate in the direction of height), with the focal point being designated the origin. If the amount of displacement in the Z direction is small, the four complex constants are practically independent of the value of z.

The phases and amplitudes of vectors VL(z) and VI(z) can be expressed as follows on the basis of geometric analysis of the propagation paths depicted in FIG. 7:

$$\angle \text{Vector } VL(z) = 2kw\, z + \angle CL \quad (2)$$

$$\angle \text{Vector } VI(z) = 2(kw/\cos\theta Lsaw - kLsaw \cdot \tan\theta Lsaw)z + \angle CI \quad (3)$$

$$= 2kw\, z \cdot \cos\theta Lsaw + \angle CI$$

$$|\text{Vector } VL(z)| = |CL \exp|(-2\alpha w\, z) \quad (4)$$

$$|\text{Vector } VI(z)| = |CI \exp| (-2\gamma z \cdot \tan\theta Lsaw - 2\alpha w\, z/\cos\theta Lsaw) \quad (5)$$

where kw is the number of waves in the sound field creating liquid medium W per unit distance; kLsaw is the number of leaky elastic waves per unit distance; $\theta$Lsaw is the critical angle of the leaky elastic wave at the interface between the liquid medium W and the sample 11; $\alpha$w is the attenuation constant in the liquid medium; $\gamma$ is the attenuation constant of the leaky elastic wave; CL is a complex constant expressing the amplitude of a respective component at position z=0 (focal point Zo); and CI is a complex constant expressing the phase of the same component at position z=0. For expansion of eq. (3), Snell's law, or kLsaw/sin $\theta$Lsaw=kw, is used.

Thus, applying eqs. (2)–(5) to vectors VL(z) and VI(z) on the right side of eq. (1) gives:

$$\text{Vector} \cdot VL(z) = CL \cdot ZL^{-z} \quad (6)$$

$$\text{Vector} \cdot VI(z) = CI \cdot ZI^{-z} \tag{7}$$

where $$ZL = \exp\{-2(-aw + jkw)\}$$

$$ZI = \exp[\{-2(\gamma - jkLsaw) \tan \theta Lsaw + (-aw + jkLsaw)/\cos \theta Lsaw \}]$$

Substituting eqs. (6) and (7) into eq. (1), we obtain:

$$\text{Vector } Va(z) = CLa' \cdot ZL^{-z} + CIa' \cdot ZI^{-z}$$

$$\text{Vector } Vb(z) = CLb' \cdot ZL^{-z} + CIb' \cdot ZI^{-z} \tag{8}$$

where $CLa' = CLa \cdot CL$, $CLb' = CLb' \cdot CL$, $CIa' = CIa \cdot CI$, $CIb' = CIb \cdot CI$.

The complex constants $CLa'$, $CLb'$, $CIa'$ and $CIb'$ in eq. (8) can be determined by solving linear equations several times, say, twice applying the Prony method (see J. D. Markel et al., translated by H. Suzuki) to the values of vectors $Va(zi)$ and $Vb(zi)$, where $zi$ represents the coordinate value in the Z direction of N points of measurement within the defocus range of period $\Delta z$ ($i = 1, 2, \ldots, N$ and N is an integer of 2 or more).

The thus determined complex constants $CLa'$, $CLb'$, $CIa'$ and $CIb'$ are stored in a parameter storage region 62e of the memory 62 to be described below.

In the next step, vectors $VL(z)$ and $VI(z)$ are determined from the parameters $CLa'$, $CLb'$, $CIa'$ and $CIb'$ by the following set of equations:

$$CL' \text{ vector } VL(z) = CIb' \text{ vector } Va(z) - CIa' \text{ vector } Vb(z)$$

$$CI' \text{ vector } VI(z) = -CLb' \text{ vector } Va(z) + CLa' \text{ vector } Vb(z) \tag{9}$$

where $$CL' = CLa \cdot CIb' - CLb \cdot CIa'$$

$$CI' = CLa' \cdot CIb - CLb' \cdot CIa.$$

By using eq. (9), vectors $VL(z)$ and $VI(z)$ can be computed from the measured vectors $Va(z)$ and $Vb(z)$. For this purpose, various programs are stored in the memory 62 in the image processing unit 6. For computing vectors $VL(z)$ and $VI(z)$ from vectors $Va(z)$ and $Vb(z)$, vector transformations by the least squares method may conveniently be employed. Needless to say, in those vector operations, noise and other unwanted phenomena may be eliminated by applying the Fourier transform to the respective data of measurement before mathematical operations are performed on those data.

The image processing unit 6 comprises the microprocessor (MPU) 61, memory 62, operating panel 63, display 64, interface 65, etc. which are interconnected by buses 66. The digital values of measurement data from the A/D 14 are taken into the image processing unit 6 via the interface 65 and stored in the memory 62. Then, the sample 11 is scanned by the acoustic probe 8 in the Z direction and the amplitudes of vectors $Va(z)$ and $Vb(z)$ and the associated phase differences are determined for each point of measurement ($zi$). Stated more specifically, the amplitudes of the respective detected reception signals and the associated phase differences which provide data for the respective vectors $Va(z)$ and $Vb(z)$ are sent from A/D 14 into MPU 61 via the measuring data memory assembly 15 and those data are sequentially stored in the memory 62 for the various points of measurement. In this case, the range of measurement points $zi$ to be taken may be smaller than the distance of movement necessary to determine one period of $\Delta z$.

The memory 62 contains an initializing/Z scanning program 62a, a vector function computing program 62b, a phase angle change computing program 62c, a sound velocity computing program 62d, a display processing program, etc. and the parameter storage region 62e which stores not only the data for the pitch of measurements in the Z direction for Z scanning (i.e., scanning in the direction of probe height) but also various parameters including the above-described complex constants $CLa'$, $CLb'$, $CIa'$ and $CIb'$.

The initializing/Z scanning program 62a is executed by MPU 61, which then performs the operation necessary to determine the initial position of the acoustic probe 8. In this operation, the relative positions of acoustic probe 8 and sample 11 as entered from the operating panel 63 are used as references to calculate the Z-coordinate of acoustic probe 8 (see height Zo in FIG. 5) in such a way that the focus will be positioned just beneath the surface of the sample 11, and the acoustic probe 8 is accordingly positioned to be situated at the calculated height Zo. This position serves as the initial position for routine Z scanning. In practice, more correct focusing of this initial position (the origin) is subsequently achieved by positioning procedures that are activated by entry on a keyboard (see below) and said position is thus finely adjusted to determine the final position. Further, a scanner 9 is controlled by permitting the MPU 61 to execute the program for performing scanning on the X-Y plane. When the X-Y plane scanning ends, the associated program is executed to perform scanning for successive movements by one pitch in the Z direction. During the period of this scanning operation, feed is made on equal pitches.

The vector function computing program 62b is such that the values of vectors $Va(z)$ and $Vb(z)$ in the measuring data memory assembly 15 (those values are the amplitudes and phase differences obtained from A/D 14 in response to varying $zi$) and the complex constants $CLa'$, $CLb'$, $CIa'$ and $CIb'$ stored in the parameter storage region 62e are referenced to compute, in association with the respective values of $zi$, the values (i.e., the magnitudes and phase differences) of vectors $VI(z)$ and $VL(z)$ in accordance with eqns. (1)–(9) for the respective points of measurements in the scanning on the X-Y plane, and the thus computed values are stored in predetermined regions of the memory 62.

The phase angle change computing program 62c computes the amount of change in phase angle, $\xi$, by the following equation with reference made to the data on the value (i.e., phase) of vector $VI(z)$ for $zi$ in memory 62:

$$\xi = \partial \angle \text{vector } VI(z)/\partial z \tag{10}$$

The computed $\xi$ is stored in the parameter storage region 62e.

Figure 3A:
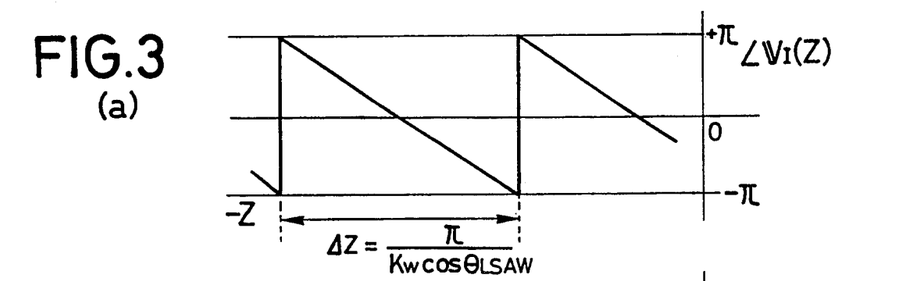
FIGS. 3(a)-(c) is a set of diagrams illustrating the phase angle relations of the vector functions of the wave of interference between the leaky elastic wave component skimming the surface of a sample and the reflected wave component in an area near the central axis of the acoustic probe.

The phase angle $\angle$vector $VI(z)$ as it relates to the z coordinate is depicted in FIG. 3(a).

The sound velocity computing program 62d computes the propagation velocity of the leaky elastic surface wave (vLsaw) by the following procedure with reference made to $\xi$ stored in the parameter storage region 62e. To begin with, the amount of change in phase angle $\xi$ is expressed by: $\xi = 2 \text{ kw} \cos \theta Lsaw$. In view of Snell's law at the interface between the sound field-creating liquid medium and the sample to be analyzed, the following equation will hold:

$$vLsaw = vw/\sin \theta Lsaw. \qquad (5)$$

If the frequency of the input burst wave applied to the acoustic probe 8 is written as f, the following equation will hold:

$$kw = 2\pi f/vw.$$

With those equations taken into account, the following equation will hold:

$$vLsaw = vw/[1-(\xi vw/4\pi f)^2]^{\frac{1}{2}} \qquad (11)$$

which yields the sound velocity vLsaw.

Under the circumstances described above, X-Y plane scanning is first performed at various values of Z-coordinate (zi) that correspond to respective points of measurement, whereupon data on the amplitudes and phase differences of vectors Va(z) and Vb(z) are obtained in the measuring data memory assembly 15 for the respective points of measurement on the X-Y plane. Subsequently, the values of Z-coordinate (zi) are updated to obtain similar data at more than one point of measurement for the Z-coordinate, which are then stored in the measuring data memory assembly 15. If one refers to the stored data in the memory assembly 15, velocity vLsaw can be computed by eqs. (1)-(11) from the respective values of zi that correspond to the various points of measurement in the X-Y plane scanning.

In accordance with the thus calculated velocity of leaky elastic surface wave, vLsaw, at each point of measurement on the X-Y plane, display data are generated by the display processing program in correspondence to the X-Y scanning position and thereafter transferred into the image memory in the display 64. As a result of these procedures, the image of the surface under examination can be displayed on the screen of the display 64. In the case described below, the pitch of measurements to be performed in the X-Y plane scanning is selected at such a value as to provide a resolution that corresponds to the velocity of leaky elastic surface wave, vLsaw.

The critical angle, $\theta Lsaw$, which the leaky elastic surface wave from the acoustic probe 8 forms with the sample 11, may be great or small depending on the situation. If it is very small, the phase difference to be detected may vary greatly in response to a small change in the value of zi, or the coordinate in the Z direction, making it impossible to apply eq. (10) unmodified.

Figure 3B:
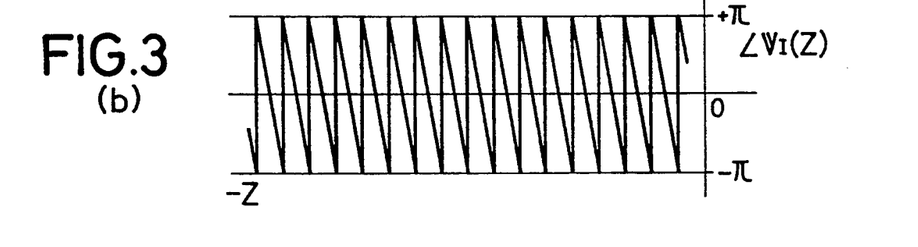

In this case, the changes shown in FIG. 3(a) may be expressed by the relationship depicted in FIG. 3(b). If the interval of two values of z that are necessary for the phase angle to change by $2\pi$ is written as $\Delta z'$, the following equations will hold:

$$|-2 kw \cos \theta Lsaw| \Delta z' = 2\pi$$

$$\Delta z' = \pi kw \cos \theta Lsaw$$

Thus, in the case where $\theta Lsaw$ is small, eq. (10) is not used and, instead, sound velocity may conveniently be determined from the change in z after subtracting vector VL(z) from vector VI(z). Stated more specifically, in view of $\Delta z = \pi/(1-\cos \theta Lsaw)kw$, the amount of change in phase angle, $\xi_1$, as determined by eq. (10) is reformulated as:

$$\xi_1 = \partial(\angle vector\ VI(z) - vector\ VL(z))/\angle z \qquad (12)$$

and, as a consequence, the sound velocity vLsaw is:

$$vLsaw = vw/[1-(1-\xi_1 vw/4\pi f)^2]^{\frac{1}{2}} \qquad (13)$$

Figure 3C:
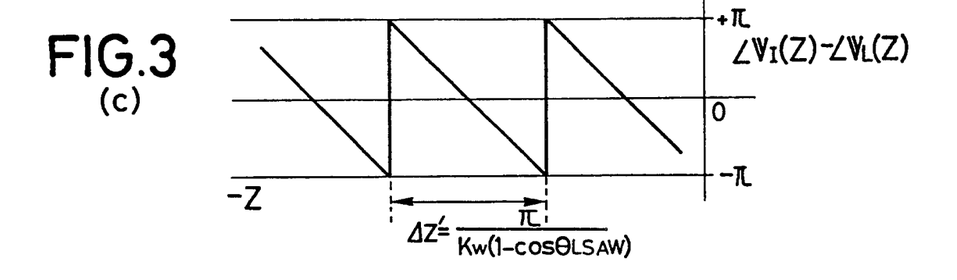

Hence, the distance of movement in the Z direction for the phase angle to vary by $2\pi$ can be increased as shown in FIG. 3(c).

The use of this amount of change, $\xi_1$, in the phase angle is particularly effective in the case where it is necessary to analyze a small region such as the one that is located near the boundary of microcrystal.

Figure 4:
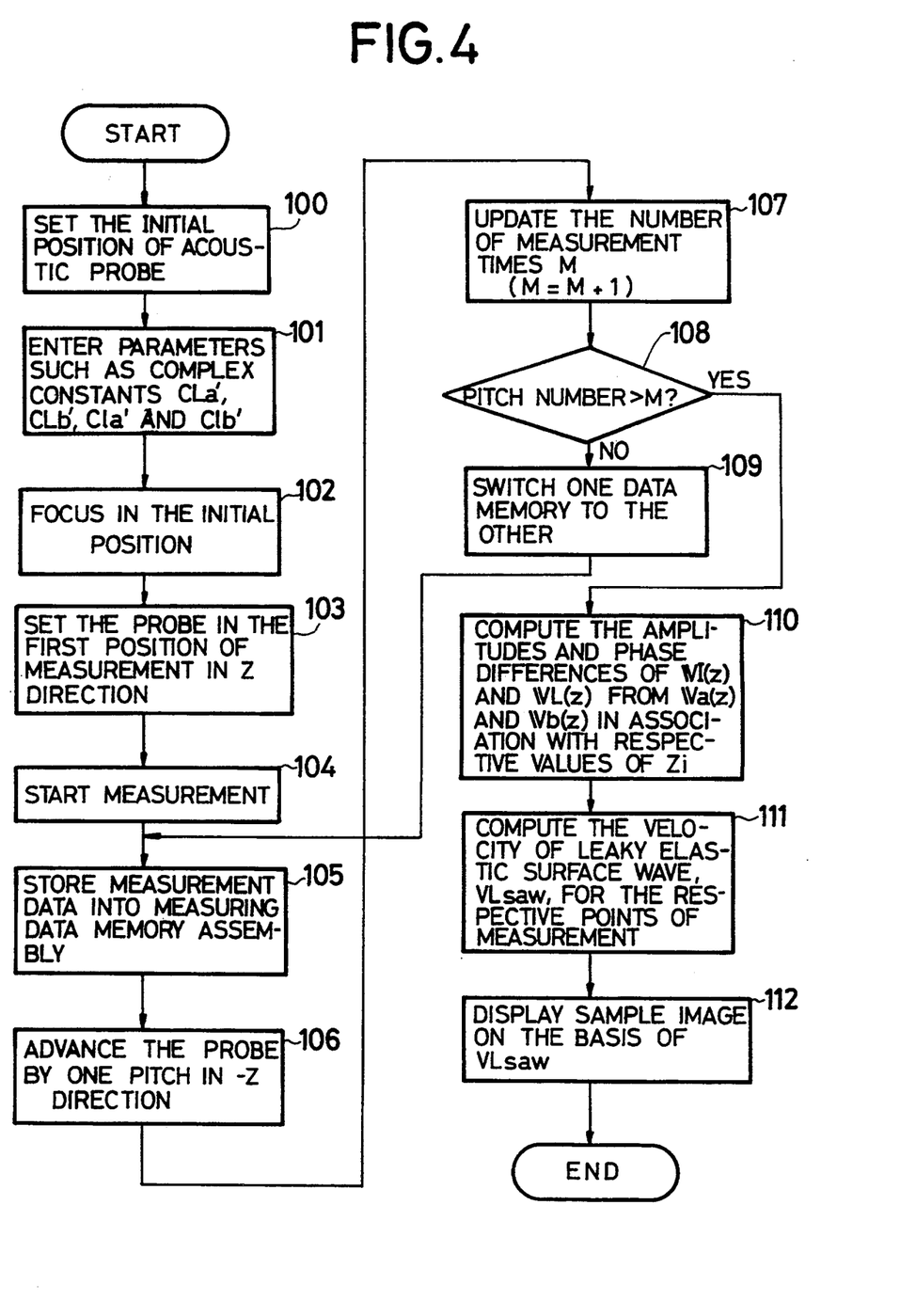
FIG. 4 is a flowchart showing the process sequence for calculating the sound velocity with the ultrasonic microscope.

FIG. 4 is a flowchart showing the process sequence for calculating the sound velocity with the ultrasonic microscope shown in FIG. 1. In step 100, the initializing/Z scanning program 62a is activated, whereupon MPU 61 starts to perform the initializing operation. As a result, the image processing unit 6 controls a controller 7 so that the acoustic probe 8 is positioned at a predetermined initial height (Zo) with respect to the sample 11. As will be described later in this specification, focusing is achieved at that position of the acoustic probe and the focused position of the probe will serve as its origin during the subsequent measurements.

In the next step 101, the complex constants CLa', CLb', CIa' and CIb', the pitch of movement in the Z direction, the number of points of measurement M in the Z direction and any other parameters necessary for measurements are set. The setting of these parameters may be performed prior to step 100 or after step 102 or even in subsequent steps. As for the complex constants CLa', CLb', CIa' and CIb', a measurement may be conducted for every one of the points of measurement for sample 11 on the X-Y plane by the same method as adopted for the measurements in step 102 onward (see below), and the value thus obtained may be entered on a keyboard or stored automatically in the parameter storage region 62e by processing with a program.

In the next step 102, the positioning procedures are performed by the operator who enters data on a keyboard, whereby the necessary focusing is accomplished. For focusing purposes, the operator examines the image on the oscilloscope 16, and the height of the sample 11 is adjusted by data entry on a keyboard in accordance with a stage processing program. The focusing position is where a maximum amount of waves is reflected from the sample 11, with the focal point of the acoustic probe 8 being in registry with the surface of the sample 11 (Zo).

In step 103, a function key that designates the end of focusing is depressed to enter data, whereupon MPU 61 activates the initializing/Z scanning program 62a, so that the Z-coordinate of the acoustic probe 8 is set to the position of $-zi$ (which was initially $zi=z_1$). This provides the first position for measurement in the Z direction.

In subsequent step 104, the Measurement Start Key on the operating panel is depressed to start the X-Y plane scanning, whereupon the system operation goes into the loop consisting of steps 105-109. In step 105, MPU 61 samples measuring data to be taken into the data memory 15a of the measuring data memory assembly 15. When this process of measurement ends, MPU 61 activates the initializing/Z scanning program 62a in step 106 and causes the acoustic probe 8 to advance by one pitch in the −Z direction. As a result of this process, the surface of the sample 11 is set at the position $z_2$. In step 107, M, or the number of measurement times, is updated by one increment (M=M+1), with the initial value of M being unity.

In step 108, decision is made as to whether the measurement has ended by asking whether M, or the maximum number of feed pitches (corresponding to the number of points of measurement in the Z direction) has been exceeded. If the answer is negative, the memory for storing the measuring data is updated in step 109, whereby the first data memory 15a is switched to the next data memory 15b, with the process returning to step 105. Then, at the position of the Z-coordinate to which the data have been sent, similar measurements are conducted to store the resulting measurement data in memory 15b. Thereafter, the data memories are successively updated until the number of measurement points (M) is reached and the measurement data thus obtained are sequentially stored in the measuring data memory assembly 15.

In this way, the acoustic probe 8 is moved in steps in the −Z direction (towards the surface of the sample 11) so that it gradually approaches the sample 11, and the data of measurements for the intensity and phase difference of each received wave of interference are obtained for each of the points of measurement on the X-Y plane.

When the measurement at all points of interest in the Z direction that are set to have equal spacings ends as a result of feed by increments of predetermined pitches, the vector function computing program 62b is activated and, in step 110, MPU 61, by referring to the values stored in the measuring data memory assembly 15 in association with the respective positions of X-Y plane scanning, and computes the amplitudes and phase differences of vectors VI(z) and VL(z) from vectors Va(z) and Vb(z) in the manner already described hereinabove.

In the next step 111, the phase angle change computing program 62c and the sound velocity computing program 62d are activated sequentially on the basis of those computed data, and MPU 61 computes the velocity of leaky elastic surface wave, vLsaw, in the sample 11 for each point of measurement on the X-Y plane. The thus computed velocity of the leaky elastic surface wave, vLsaw, is transformed to display data in step 111, where it is sent to the display 64 and displayed as image data of the sample being analyzed.

Figure 5:
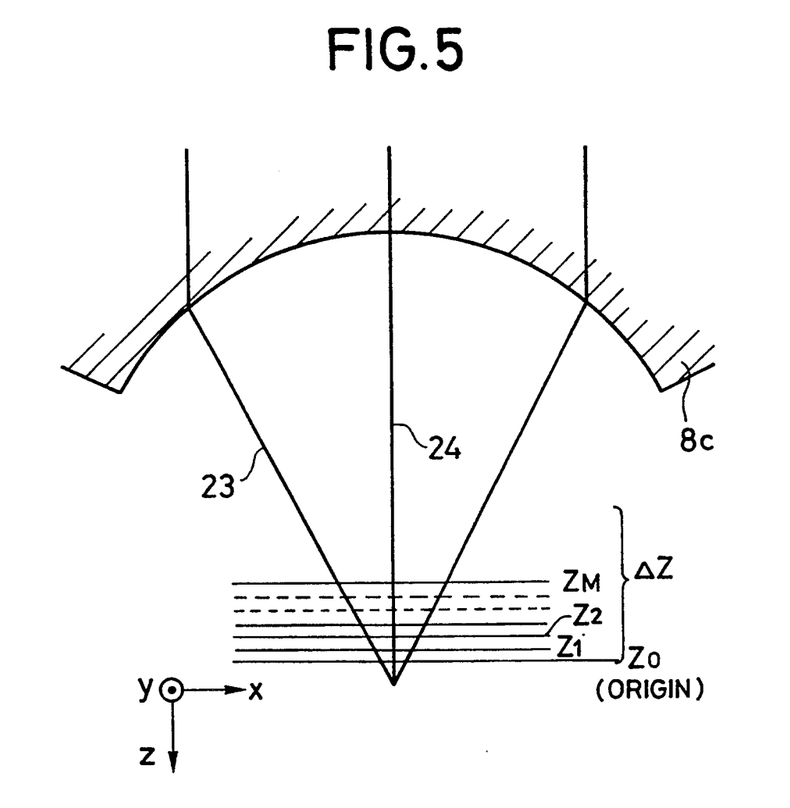
FIG. 5 is a diagram showing the relationship between the relative movement of the sample in the Z direction during measurement and the position of the acoustic probe.

It should be noted here that the total sum of the number of points of measurement in the Z direction and the amount of movement is smaller than the period Δz on the V(z) characteristic curve as shown in FIG. 5. Therefore, the width of the surface of sample 11 through which the leaky elastic surface wave propagates will become smaller than in the case of measurement of period Δz. In other words, the path width for computing the velocity, vLsaw, of the leaky elastic surface wave to be measured decreases by a sufficient amount to improve the resolution of the displayed image of the sample being examined.

The feed control for the pitch that determines the amount of movement of the acoustic probe 8 in each of X-, Y-and Z-directions can be computed by means of a loop counter, and this contributes to more efficient control.

The forgoing discussion concerns the case where the ultrasonic microscope 20 is used as a microscope proper which is designed to display an ordinary image. It should, however, be noted that the measurement of the velocisty of the leaky elastic surface wave, vLsaw, in terms of the V(z) characteristics is often employed to analyze the crystalline structure, anisotropy and other structural features of materials, rather than to display the image of the surface state of those materials. In this common case, the ultrasonic microscope itself is used as an apparatus for measuring the velocity of ultrasonic sounds.

An example of the structural analyses of materials is analyzing the state of those regions of grains in ceramics, metal crystals, etc. which have partially different axes of crystals. Since particularly high resolution is required in that case, the present invention will prove effective. It should be particularly noted that in structural analyses of the kind contemplated, it is necessary to measure the sound velocity in small regions on the surface of a material of interest and it is also necessary to provide directionality by limiting the propagation path of the leaky elastic surface wave in order to analyze such parameters as the directionality of crystal axes.

Figure 6:
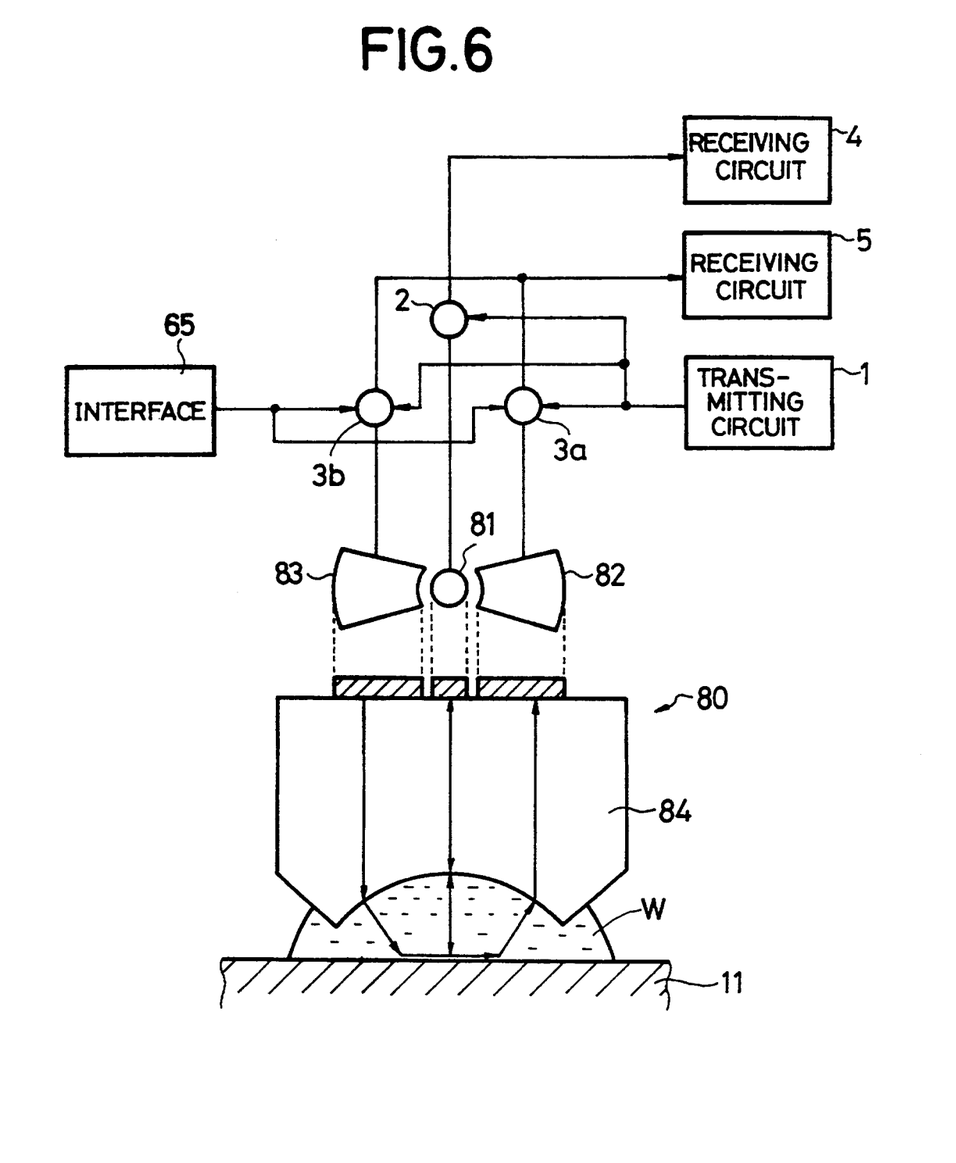
FIG. 6 shows an acoustic probe suitable for the structural analysis of a sample as it is seen both from the top and in transverse section.

FIG. 6 shows in plan view the structure of a transducer in an acoustic probe that is effective for the contemplated structural analysis of materials. The acoustic probe generally indicated by 80 has a center transducer 81 (thin piezoelectric film) that corresponds to the transducer 8a shown in FIG. 2. Instead of providing the annular transducer 8b as shown in FIG. 2, two transducers 82 and 83 (both being a thin piezoelectric film) that resemble the wings of a butterfly in shape are provided in such a way that they partly surround the transducer 81, with the other part of the transducer 81 being left open. Shown by 84 is an acoustic lens. In FIG. 6, the components that are identical to those shown in FIGS. 1 and 2 are identified by like numerals.

Transducers 82 and 83 receive burst signals from the transmission circuit 1 via the switching circuits 3a and 3b, respectively, and the wave signals emitted from the sample 11 are received by those transducers and sent to the receiving circuit 5 after conversion to electrical signals. Like the transducer 8a in the acoustic probe 8, the transducer 81 receives a burst signal from the transmission circuit 1 via the switching circuit 2, picks up a received signal from the sample 11 and sends it to the receiving circuit 5. Upon receiving a switching signal from the interface 65, the switching circuits 3a and 3b establish selective connection in such a way that either one of the side transducers 82 and 83 works as an electrode (thin piezoelectric film) for the transmission mode whereas the other transducer works as an electrode (thin piezoelectric film) for the reception mode.

In the case shown in FIG. 6, the transducer 83 is used as the electrode for the transmission mode and the transducer 82 is used as the electrode for the reception mode. The switching signal from the interface 65 is controlled by the MPU 61. Hence, MPU 61 is capable of controlling the switching circuits 3a and 3b in such a way that the transducer 82 works as the electrode for transmission mode whereas the transducer 83 works as the electrode for reception mode. Needless to say, both transducers 82 and 83 may be adapted to work as electrodes not only for the transmission mode but also for the reception mode.

The arrangement described above enables the leaky elastic surface wave to be detected only when it has been transmitted in paths parallel to the transducers 82 and 83.

The ultrasonic sound velocity measuring apparatus of the present invention may use the acoustic probe 80 to measure the velocity of a leaky elastic surface wave, vLsaw, and the procedure of data processing for computing the sound velocity need not be described in detail since it is essentially the same as in the aforementioned case of the ultrasonic microscope 20.

In the embodiments described above, the velocity of the leaky elastic surface wave, vLsaw, is determined but, if desired, the attenuation factor of a certain material can be readily determined by obtaining data on the vector functions of interference wave with respect to the position in the defocusing direction. Stated more specifically, the attenuation constant, $\alpha w$, in the sound field-creating medium is first determined from the values of vector VL(z) by eq. (4) and, then, the attenuation constant, $\gamma$, of the leaky elastic surface wave can be determined from the values of $\alpha w$ and vector VI(z) by eq. (5). Thus, the attenuation constant of a certain material can be correctly computed by obtaining the values of data on the vector functions of interference wave, i.e., vector VL(z) and vector VI(z).

In the embodiments described above, a burst signal from the transmission circuit is used as a reference signal for detecting the phase difference, but it should be noted that this burst signal may be replaced by any other reference signal that is synchronous with said burst signal.

What is claimed is:

1. An apparatus for measuring the velocity of an ultrasonic acoustic wave in terms of the V(z) characteristics, comprising:

a focusing acoustic probe, including a first transducer for receiving a first acoustic wave reflected from a sample at a central portion of the acoustic probe and a second transducer for receiving a second acoustic wave reflected from the sample at a peripheral portion of the acoustic probe, for outputting a first reception signal representing said first acoustic wave and a second reception signal representing said second acoustic wave, wherein said first and second transducers are disposed in a common plane;

driving means for driving said acoustic probe in response to an externally supplied driving signal to cause the first and second transducers to emit acoustic waves toward the sample for reflection back to said first and second transducers as said first and second acoustic waves;

moving means for moving the sample relative to said acoustic probe from a focal point of said acoustic probe to a defocus point that is closer to said acoustic probe than is said focal point;

sampling means for sampling the received first and second acoustic waves and for deriving intensity and phase difference values from results of the sampling, said phase difference values representing differences in phase between each of the first and second received acoustic waves and one of the driving signal and a predetermined corresponding reference signal; and velocity computing means for computing a velocity of a leaky elastic surface wave component, reradiated by the sample in response to an acoustic wave emitted by the acoustic probe in response to the driving signal, as a vector function of position-dependent data representing an interference wave generated by interference between said leaky elastic surface wave component and a reflected wave component near a central axis of the acoustic probe, said data being obtained by said sampling means for a plurality of sample positions in a defocus direction resulting from sample movement by said moving means.

2. An apparatus for measuring the velocity of an ultrasonic acoustic wave in terms of the V(z) characteristics, comprising:

a focusing acoustic probe, including a first transducer for receiving a first acoustic wave reflected from a sample at a central portion of the acoustic probe and a second transducer for receiving a second acoustic wave reflected from the sample at a peripheral portion of the acoustic probe, for outputting a first reception signal representing said first acoustic wave and a second reception signal representing said second acoustic wave, wherein said first and second transducers are disposed in a common plane;

driving means for driving said acoustic probe in response to an externally supplied driving signal to cause the first and second transducers to emit acoustic waves toward the sample for reflection back to said first and second transducers as said first and second acoustic waves;

moving means for moving the sample relative to said acoustic probe from a focal point of said acoustic probe to a defocus point that is closer to said acoustic probe than is said focal point;

sampling means for sampling the received first and second acoustic waves and for deriving intensity and phase difference values from results of the sampling, said phase difference values representing differences in phase between each of the first and second received acoustic waves and one of the driving signal and a predetermined corresponding reference signal; and velocity computing means for computing a velocity of a leaky elastic surface wave component, reradiated by the sample in response to an acoustic wave emitted by the acoustic probe in response to the driving signal, as a vector function of position-dependent data representing the leaky elastic surface wave component, said data being obtained by said sampling means for a plurality of sample positions in a defocus direction resulting from sample movement by said moving means.

3. An apparatus as claimed in claim 2, wherein said position-dependent data are data representing an interference wave generated by interference between said leaky elastic surface wave component and a reflected wave component near a central axis of the acoustic probe, and wherein said velocity computing means includes means for data processing said position-dependent data according to the vector function to compute the velocity as a function of wave interference between the leaky elastic surface wave component and a reflected wave component near the central axis of the acoustic probe.

4. An apparatus according to claim 2, wherein said vector function is a function not only of said leaky elastic surface wave component but also of a reflected wave component near the central axis of said acoustic probe.

5. An apparatus according to claim 2, further comprising means for computing the attenuation factor of said sample of interest on the basis of said position-dependent data.

6. An apparatus according to claim 2, wherein each of said transducers has a thin piezoelectric film and the drive signal is a burst signal.

7. An apparatus according to claim 2, wherein said second transducer comprises two transducer segments that are disposed outside said first transducer in a manner symmetrical with respect to the central axis of said acoustic probe.

8. An apparatus according to claim 2, wherein said sampling means comprises a first signal receiving circuit that amplifies a signal as received from the first transducer, a second signal receiving circuit that amplifies a signal as received from the second transducer, a first phase difference detector circuit for receiving the output signal from the first signal receiving circuit and either the signal for driving said acoustic probe or the predetermined corresponding reference signal, a second phase difference detector circuit for receiving the output signal from the second signal receiving circuit and either the signal for driving said acoustic probe or the predetermined corresponding reference signal, and an A/D converter circuit for receiving output signals from the first and second signal receiving circuits and output signals from the first and second phase difference detector circuits and performing A/D conversion on each of the output signals, and wherein the velocity computing means is an operational processing unit that receives an output from said A/D converter circuit.

9. An apparatus according to claim 8, which further includes first and second wave detecting circuits that detect the waveforms of the output signals from the first and second signal receiving circuits, respectively, wherein the detecting circuits output detection signals to said A/D converter circuit as amplitude values of the output signals from the first and second signal receiving circuits.

* * * * *